(12) United States Patent
Fukuzawa et al.

(10) Patent No.: US 7,733,762 B2
(45) Date of Patent: Jun. 8, 2010

(54) SUPER-RESOLUTION OPTICAL RECORDING MEDIUM AND METHOD FOR RECORDING INFORMATION ON SUPER-RESOLUTION OPTICAL RECORDING MEDIUM

(75) Inventors: Narutoshi Fukuzawa, Tokyo (JP); Takashi Kikukawa, Tokyo (JP); Tatsuhiro Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 809 days.

(21) Appl. No.: 11/635,620

(22) Filed: Dec. 8, 2006

(65) Prior Publication Data

US 2007/0140087 A1    Jun. 21, 2007

(30) Foreign Application Priority Data

Dec. 20, 2005    (JP)    ............................ 2005-366483

(51) Int. Cl.
   *G11B 7/00*    (2006.01)
(52) U.S. Cl. ................... 369/275.4; 369/272.1
(58) Field of Classification Search .................. None
   See application file for complete search history.

(56) References Cited

U.S. PATENT DOCUMENTS

2005/0219994 A1*   10/2005   Fukuzawa et al. ......... 369/275.2

2006/0250916 A1    11/2006   Kikukawa et al.

FOREIGN PATENT DOCUMENTS

| JP | A-2003-006872 | 1/2003 |
|---|---|---|
| JP | A-2004-87073 | 3/2004 |
| JP | A-2005-285204 | 10/2005 |

OTHER PUBLICATIONS

Takashi Kikukawa et al.; "Scanning Probe Microscope Observation of Recorded Marks in Phase Change Disks;" *Microsc. Microan.*; vol. 7; pp. 363-367; 2001.

* cited by examiner

*Primary Examiner*—Joseph H Feild
*Assistant Examiner*—Joseph Haley
(74) *Attorney, Agent, or Firm*—Oliff & Berridge, PLC

(57) ABSTRACT

A super-resolution optical recording medium has at least a recording layer and a super resolution layer on a substrate. A recording mark with the size of a resolution limit or less and a space with the size of the resolution limit or less are formed in the super-resolution optical recording medium by adjusting the intensity of a laser for recording or an emission pattern of the laser for recording such that at least the recoding mark with the size of the resolution limit or less out of recording marks in a modulation code is formed into a concave section with respect to a not-recorded section.

3 Claims, 7 Drawing Sheets

SUPER-RESOLUTION OPTICAL RECORDING MEDIUM AND METHOD FOR RECORDING INFORMATION ON SUPER-RESOLUTION OPTICAL RECORDING MEDIUM

BACKGROUND OF THE INVENTION

1. Field of the Invention

The present invention relates to a super-resolution optical recording medium which can reproduce information by irradiating reproduction light onto recording marks formed in a recording layer. The present invention relates in particular to a super-resolution optical recording medium from which small recording marks with the size of the resolution limit or less of the reproduction optical system can be reproduced, and a method for recording information on the super-resolution optical recording medium.

2. Description of the Related Art

In recent years, as described in, for example, Japanese Patent Laid-Open Publication No. 2003-6872, a super-resolution optical recording medium has been proposed, from which a recording mark train smaller than the diffraction limit of a reproduction optical system can be reproduced.

In the case of a conventional optical recording medium, in general, it is impossible to read a recording mark train the period of which is a certain recording mark train period or less, using a reproduction method that uses light. The length of this recording mark train period is referred to as a diffraction limit. In a reproduction optical system with a wavelength of $\lambda$ and a numerical aperture of NA, the diffraction limit is represented as $\lambda/NA/2$. If the length of a recording mark section is equal to that of a blank area in one period, then the length of the recording mark is represented as $\lambda/NA/4$. The length of the recording mark is referred to as a resolution limit.

Thus, reducing the wavelength $\lambda$ and/or increasing the numerical aperture NA reduces the resolution limit, and hence increases the recording density. However, the ability to further shorten the wavelength and increase the numerical aperture is becoming limited. The aforementioned super-resolution optical recording medium has adopted technologies for reproducing recording marks smaller than $\lambda/NA/4$ to further increase the recording density without shortening the wavelength $\lambda$ and increasing the numerical aperture NA.

The above-described conventional optical recording medium includes a phase-change recording film, as described in, for example, Scanning Probe Microscope Observation of Recorded Marls in Phase Change Disks: Takashi Kikukawa and Hajime Utsunomiya, Microsc. Microanal., 7 (2001) 363-367. Therefore, the recording mark or the recording layer in the vicinity thereof is not deformed by the recording operation.

SUMMARY OF THE INVENTION

In view of the foregoing problems, various exemplary embodiments of this invention provide a super-resolution optical recording medium which can further increase its recording density, and provide a method for recording information on the super-resolution optical recording medium.

As a result of diligent study, the inventor found that in the surface shape of a super-resolution optical recording medium along a track, forming at least a mark with the size of the resolution limit or less in the modulation code into a concave section with respect to a not-recorded section makes it possible to record information at a high CNR (carrier to noise ratio).

In summary, the above-described objectives are achieved by the following embodiments of the present invention.

(1) A super-resolution optical recording medium comprising a substrate and a recording layer formed on the substrate, wherein a recording mark, which has a size of a resolution limit or less of a reproduction optical system and can be reproduced by the reproduction optical system, is formed in the recording layer along a recording track, and at least the recording mark with the size of the resolution limit or less out of recording marks in a modulation code is a concave section with respect to a not-recorded section.

(2) The super-resolution optical recording medium according to (1), wherein a ratio $h_m/ML$ between a height of the recording mark with respect to the not-recorded section in which a recording mark is not formed in the recording layer and a mark size ML is $-0.20 \leq h_m/ML \leq -0.01$.

(3) The super-resolution optical recording medium according to (1), wherein a height of the recording mark, with respect to the not-recorded section in which a recording mark is not formed in the recording layer, is higher than a height of another recording mark with respect to the not-recorded section, the another recording mark being longer than the recording mark.

(4) An optical recording method for forming a recording mark and a space, which each have a size of a resolution limit or less of a reproduction optical system and can be reproduced by the reproduction optical system, in a recording layer of a super-resolution optical recording medium having a substrate and at least the recording layer, a super resolution layer, and a light transmission layer, all of which are formed on the substrate, the method comprising: forming the recording mark with the size of the resolution limit or less and the space with the size of the resolution limit or less by adjusting an intensity of a laser for recording or an emission pattern of the laser for recording such that at least the recording mark with the size of the resolution limit or less out of recording marks in a modulation code is formed into a concave section with respect to a not-recorded section.

According to this invention, along the track in the cross section of the super-resolution optical recording medium, at least the short recording mark with the size of the resolution limit or less in the modulation code is formed into the concave section and spaces before and after the recording mark which are in the size of the resolution limit or less are formed into convex sections, so that it is possible to record information at high CNR. Also, it is possible to record information with a preferable frequency characteristic by making the height of the short recording mark with respect to a not-recorded section higher than the height of a long recording mark with respect to the not-recorded section.

DETAILED DESCRIPTION OF THE PREFERRED EMBODIMENTS

A super-resolution optical recording medium according to the best mode has a substrate, and at least a recording layer and a super resolution layer which are formed on the substrate. In the recording layer, recording marks are formed which are in the size of the resolution limit of a reproduction optical system or less and can be reproduced in a reproduction optical system. The ratio $h_m/ML$ between the height of the recording mark with respect to the not-recorded section and a mark size is defined as $-0.20 \leq h_m/ML \leq -0.01$.

The recording marks and spaces having one or more lengths are formed in this super-resolution optical recording medium in accordance with a suitable modulation code. Of such recording marks, the minimum recording mark with the size of the resolution limit or less is distinguished as to whether it is a concave section or a convex section by observation of any gradation in an AFM or SEM image in plan view on the surface that appears when a light transmission layer is removed or by obtaining a concavo-convex profile by a tracer and the like. The light transmission layer may be physically removed. In instances where it is difficult to physically remove the light transmission layer, especially in instances where surface shape cannot be retained, a solvent such as chloroform may be used to dissolve the light transmission layer.

It is possible to observe the concave section and the convex section by recording a random signal. However, it is also possible to in fact distinguish the concave section from the convex section by recording and observing a signal which is composed of the recording marks with a specific mark length and the spaces with a specific space length alternately arranged in succession.

First Exemplary Embodiment

A first exemplary embodiment of the present invention will be hereinafter described in detail with reference to FIGS. 1 to 3.

Figure 1:
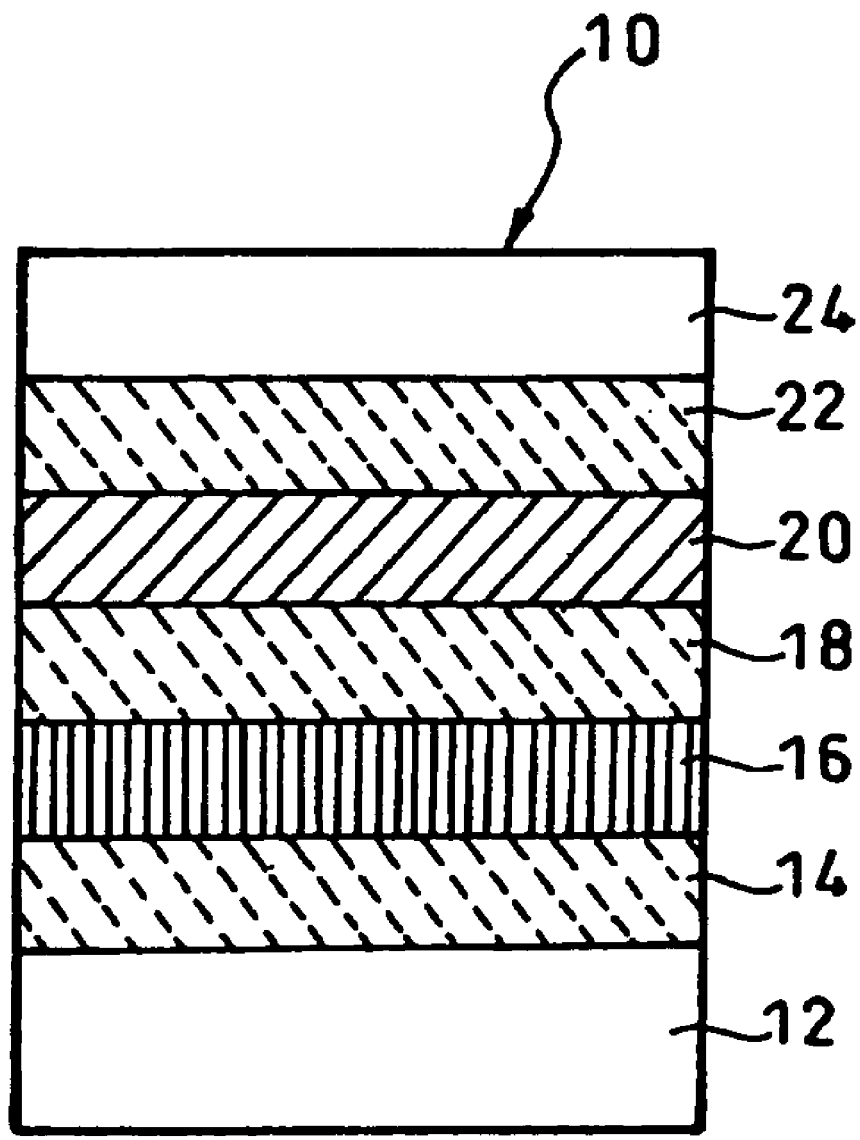
FIG. 1 is a sectional view schematically showing a super-resolution optical recording medium according to an exemplary embodiment of the present invention.

As shown in FIG. 1, a super-resolution optical recording medium 10 according to the first exemplary embodiment of the present invention is configured to include a first dielectric layer 14, a super resolution layer 16, a second dielectric layer 18, a recording layer 20, a third dielectric layer 22, and a light transmission layer 24, all of which are formed in this order on the substrate 12.

In the example shown in FIG. 1, a laser beam is incident on the light transmission layer 24 opposite to the substrate 12. When the laser beam is incident on the substrate, however, the substrate serves as a light transmission layer.

The substrate 12 is made of polycarbonate, for example. The first dielectric layer 14, the second dielectric layer 18, and the third dielectric layer 22 are made of a semiconductor, an oxide or a sulfide of metal or the like such as $ZnS$—$SiO_2$, $ZnS$, and $ZnO$.

The recording layer 20 is made of a material such as PtOx in which the optical constant of such changes as a result of thermal decomposition into platinum and oxygen, but the material is not limited to PtOx. Other materials are available so long as their optical constants change due to application of a recording laser beam, and a recording mark formed in the recording layer 20 does not disappear when a reproduction laser beam is applied to the super resolution layer 16.

The super resolution layer 16 is made of a material with super resolution, meaning the material is capable of reproducing the recording mark with a length of $\lambda/4NA$ or less. The super resolution layer is made up of at least one of materials of the following; being any element of Sb, Bi, and Te and any compound of Sb, Bi, Te, Zn, Sn, Ge, and Si, and, for example, any compound containing any of the aforementioned elements such as Sb—Zn, Te—Ge, Sb—Te, Sb—Bi, Bi—Te, and Sb—Bi—Te.

Furthermore, the material that makes up the super resolution layer 16 may contain at least one of Ag and In in addition to the aforementioned materials.

Practically, the first, second, and third dielectric layers 14, 18, and 22 formed on the substrate 12 are made of, for example, $(ZnS)_{85}(SiO_2)_{15}$, the recording layer 20 is made of PtOx, and the super resolution layer 16 is made of $Sb_{75}Te_{25}$ to form the overall structure of the super-resolution optical recording medium 10.

Figure 2:
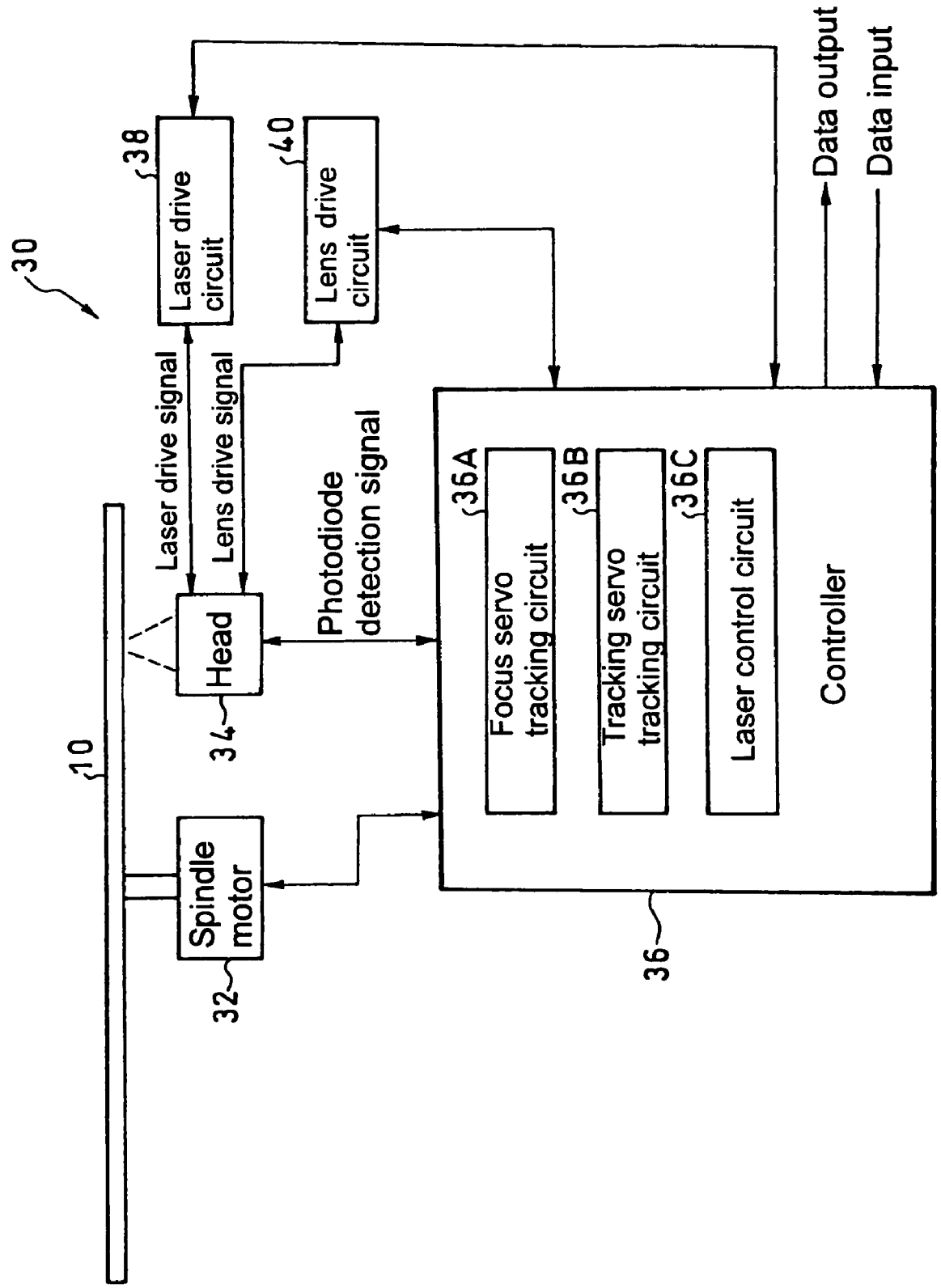
FIG. 2 is a block diagram of an information recording and reproducing device for recording information on and reproducing it from the super-resolution optical recording medium.

An information recording/reproduction device 30 as shown in FIG. 2 records and reproduces information on and from the super-resolution optical recording medium 10 having the aforementioned structure.

The information recording/reproduction device 30 is configured to include a spindle motor 32 for rotating the super-resolution optical recording medium 10, a head 34 for applying the laser beam to the optical recording medium 10, a controller 36 for controlling the head 34 and the spindle motor 32, a laser drive circuit 38 for providing a laser drive signal which controls the modulation of the laser beam from the head 34 into a pulse row, and a lens drive circuit 40 for providing the head 34 with a lens drive signal.

The controller 36 includes a focus servo tracking circuit 36A, a tracking servo tracking circuit 36B, and a laser control circuit 36C.

The laser control circuit 36C generates the laser drive signal provided by the laser drive circuit 38. The laser control circuit 36C generates the appropriate laser drive signal based on the recording condition configuration information being recorded on the target super-resolution optical recording medium while data is being recorded, and generates the laser drive signal so that the laser beam has a predetermined power in accordance with the type of target optical recording medium used while data is being reproduced.

Figure 3:
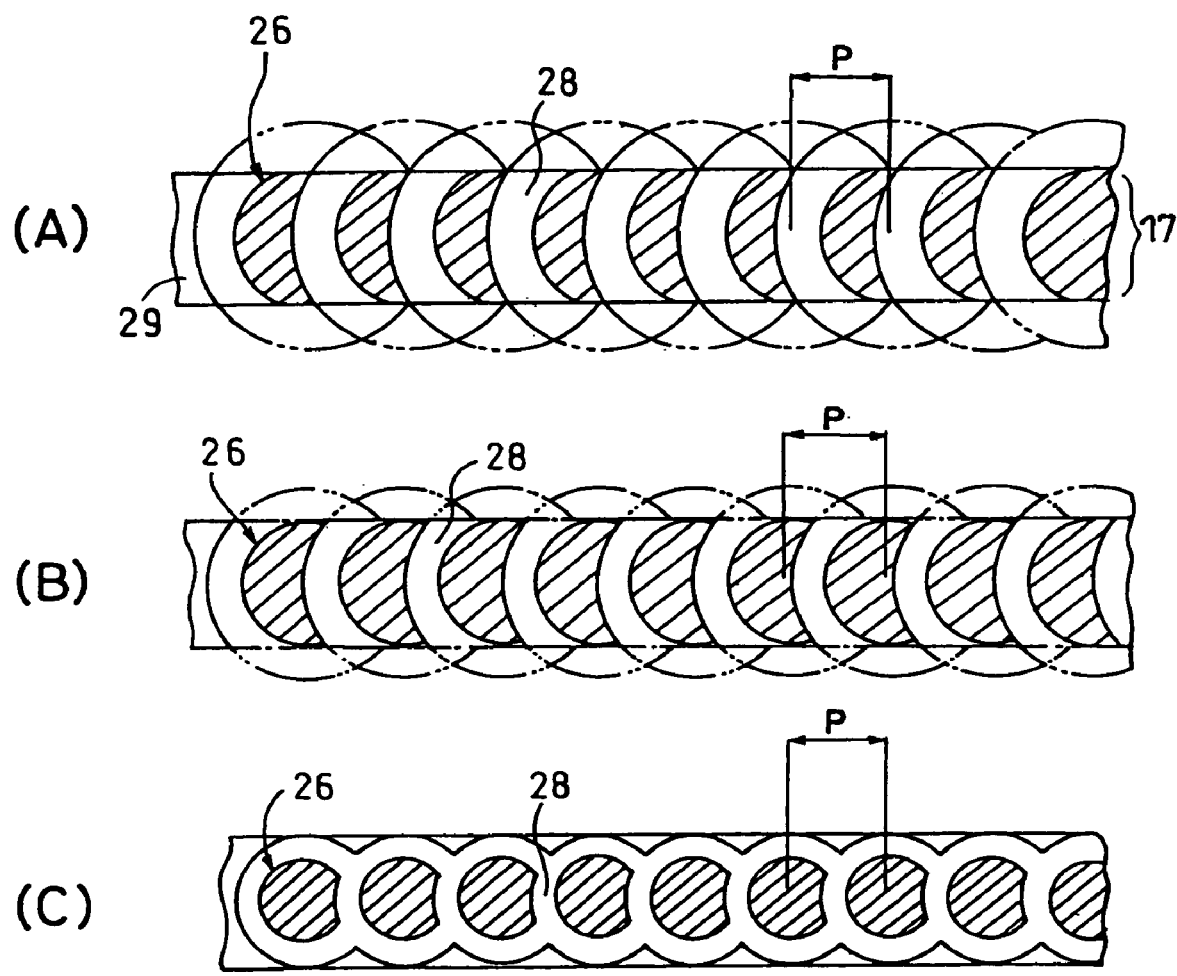
FIG. 3 is a plan view which schematically shows minimum recording marks formed on a recording layer of the super-resolution optical recording medium.

Such an information recording/reproduction device 30 continuously forms recording marks in the recording layer 14 with varying recording power at two stages (FIG. 3(A) shows the case using maximum power and FIG. 3(C) shows the case using minimum power). When observing recording marks 26 in-plan by an AFM in a state that the light transmission layer 22 is removed, as shown in FIG. 3, the recording marks 26 are formed into concave sections with respect to a not-recorded section 29 in the AFM image showing a plan view of the surface. Conversely, space sections 28 are necessarily formed into convex sections.

Since the AFM image shows an image on which a configuration (concavo-convex) on the surface is reflected, it is clearly illustrated that the recording marks are formed by the occurrence of deformation due to recording being undertaken in the super-resolution optical recording medium using a recording method according to the present exemplary embodiment. It is known that these recording marks appear to be different from those formed in a conventional phase-change type of medium, as described in document (Scanning Probe Microscope Observation of Recorded Marls in Phase Change Disks: Takashi Kikukawa and Hajime Utsunomiya, Microsc. Microanal., 7 (2001) 363-367) in which deformation is not formed by recording.

The reason why the recording mark 26 is formed into the concave section is not always clear. It is conceivable that in mark sections heated by the recording laser beam, the super resolution layer dissolves concurrently with variations in the volume of the recording layer and the super resolution layer which becomes easily flowable due to variations in the volume of the recording layer is pushed into an adjacent space layer, and hence the recording mark 26 having the shape shown in FIG. 3 is formed.

The difference $h_m$ in the height of the recording mark 26 with respect to the not-recorded section 29 in the recording layer 20 is represented by a minus sign when the height of the not-recorded section 29 is set at zero. The not-recorded section may be a complete not-recorded section. However, the middle of the space section which is approximately more than twice as long as the resolution limit may also be defined as the not-recorded section. It has been confirmed that the vicinity of the middle of the space section exhibiting such a length has the same height as the not-recorded section.

FIG. 3 shows a case where the super-resolution marks of 75 nm ($<\lambda/NA/4$) and spaces (where both are no longer than the resolution limit) are successively formed by use of an optical system of $\lambda=405$ nm and NA=0.85, however, the present invention is not limited thereto. The super-resolution optical recording medium 10 has the recording marks with the size of the resolution limit or less, except for in the 75 nm case detailed above, even if the abovementioned optical system is used, and the present invention is applicable to this case, as a matter of course. Furthermore, irrespective of the abovementioned optical system, the present invention is applicable to recording marks with various sizes no longer than the resolution limit and spaces no longer than the resolution limit in accordance with a modulation code. There is a case where a modulation code has recorded both marks with the size of the resolution limit or more and spaces with the size of the resolution limit or more as a matter of course, instead of the recording marks with the size of the resolution limit or less and the spaces with the size of the resolution limit or less. In the present invention, however, at least the recording marks with the size of the resolution limit or less and the spaces with the size of the resolution limit or less should be in a desired condition.

The recording marks 26 and spaces 28 in the shapes as shown in FIG. 3 are formed only when the power of the recording laser beam is within a certain range.

Example 1

A super-resolution optical recording medium according to example 1 includes an Ag-alloy reflection film with a thickness of 40 nm, a first dielectric layer made of ZnS:SiO$_2$=85:15 with a thickness of 80 nm, a super resolution layer made of Sb$_{75}$Te$_{25}$ with a thickness of 10 nm, a second dielectric layer made of ZnS:SiO$_2$=85:15 with a thickness of 40 nm, a recording layer made of PtOx with a thickness of 4 nm, a third dielectric layer made of ZnS:SiO$_2$=85:15 with a thickness of 90 nm, and a light transmission layer with a thickness of 0.1 mm, all of which are laminated in this order on a polycarbonate substrate.

In the medium having such a structure, it is conceivable that recording decomposes the PtOx (the recording layer) into Pt and O$_2$ to deform the recording layer into recording marks, and the optical change of Sb$_{75}$Te$_{25}$ (the super resolution layer) makes the reproduction of a signal with the recording marks with the size of the resolution limit or less and spaces with the size of the resolution limit or less, in other words, super-resolution reproduction possible. It should be appreciated that the structure and materials of the medium, in which the recording marks with the deformation are formed to make the super-resolution reproduction possible, are not limited to the abovementioned example. A recording film allowing deformation recording by which the recording marks is formed into the concave sections and the spaces before and after the recording marks are formed into the convex sections and a super resolution layer allowing super resolution may also be appropriately adopted.

The reason why the deformation recording, by which the recording marks with the size of the resolution limit or less are formed into the concave sections and the spaces with the size of the resolution limit or less before and after the recording marks are formed into the convex sections as described above, provides favorable characteristics is not presently clear.

Figure 4:
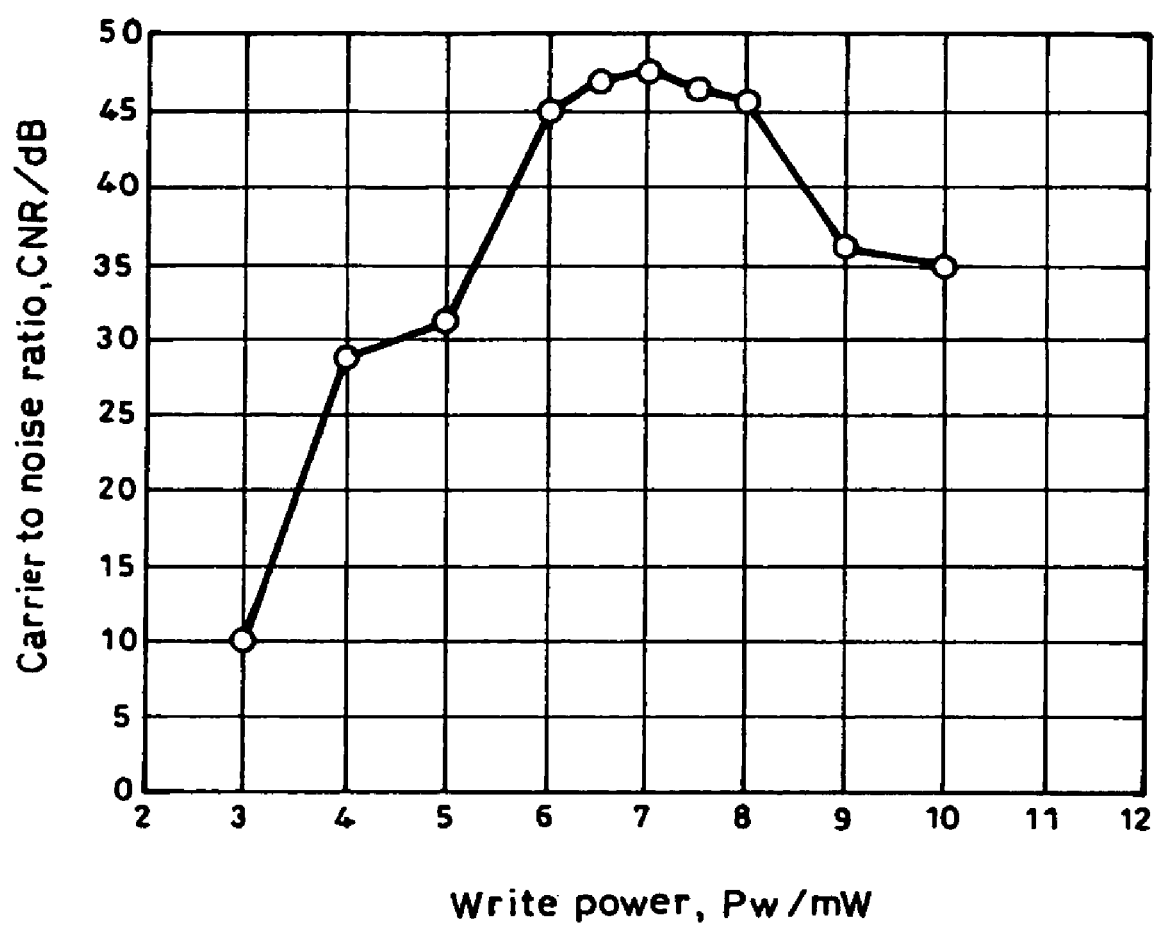
FIG. 4 is a graph showing the relationship between the recording power and the CNR in a 2T mark train recorded on the super-resolution optical recording medium of example 1.

On the super-resolution optical recording medium manufactured under the aforementioned conditions, a single frequency signal (a wavelength of 405 nm, NA=0.85, and the diameter of a beam spot is approximately 480 nm) with the recording marks/spaces of 75 nm was formed with varying the power of the recording laser beam at eight stages. Table 1 (showing the CNR vs. Pw) and FIG. 4 show the CNR(dB) in a mark train when the signal is reproduced with the reproduction power at which super resolution occurs.

TABLE 1

| Pw(mW) | CNR(dB) |
|---|---|
| 0.0 | — |
| 3.0 | 10.1 |
| 4.0 | 28.9 |
| 5.0 | 31.3 |
| 6.0 | 44.9 |
| 7.0 | 47.5 |
| 8.0 | 45.5 |
| 9.0 | 36.2 |
| 10.0 | 35.1 |

Figure 5:
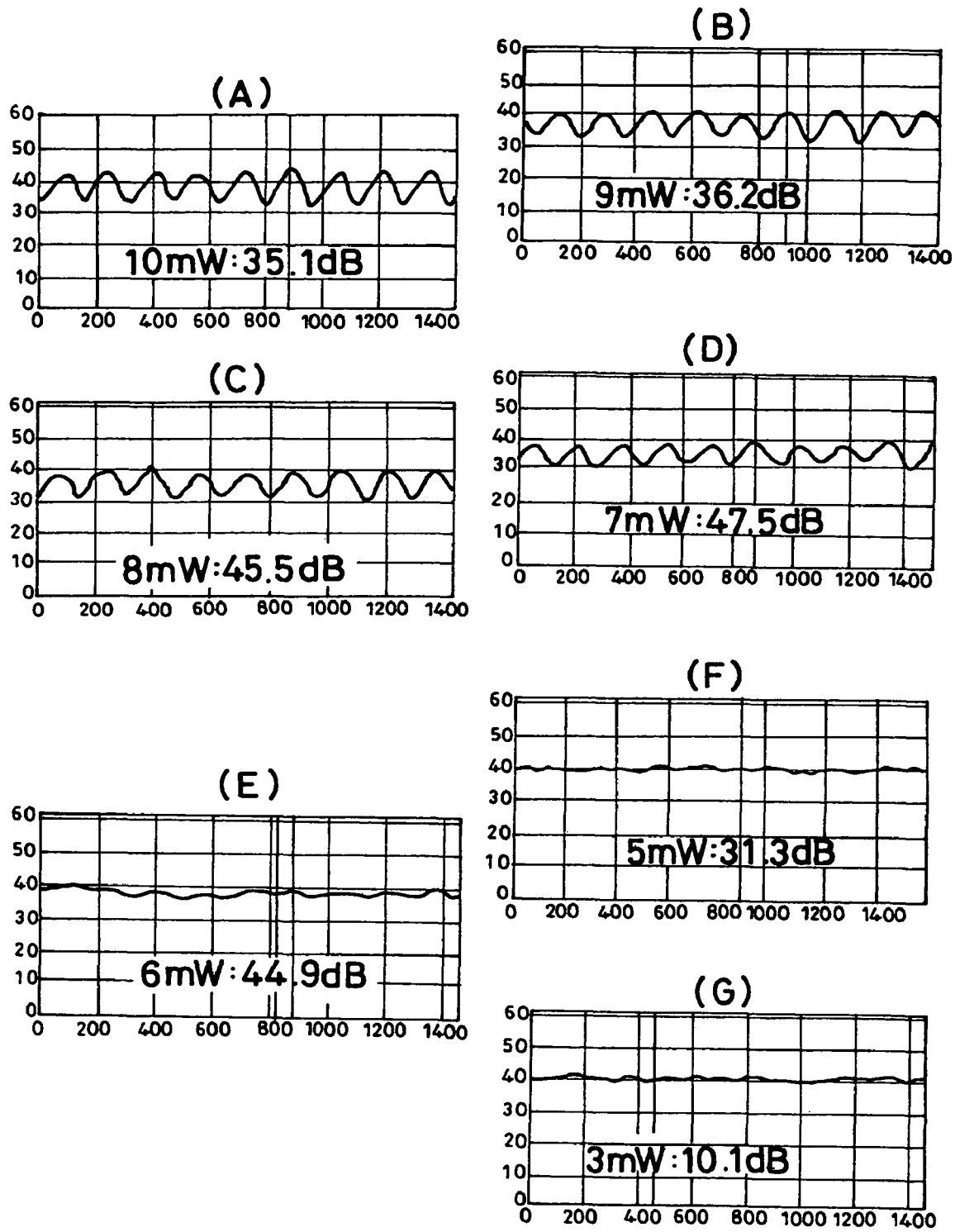
FIG. 5 is a graph showing a concavo-convex profile in the cross section of the mark train.

After the recording marks (75 nm) with the size of the resolution limit or less and the spaces (75 nm) with the size of the resolution limit or less were alternately formed in succession, the light transmission layer 22 was removed away from the super-resolution optical recording medium 10 and the remains were observed by an AFM. FIG. 5 shows concavo-convex profiles viewed in a straight line scanning through the center of each of the recording marks along a track in an AFM image.

Figure 6:
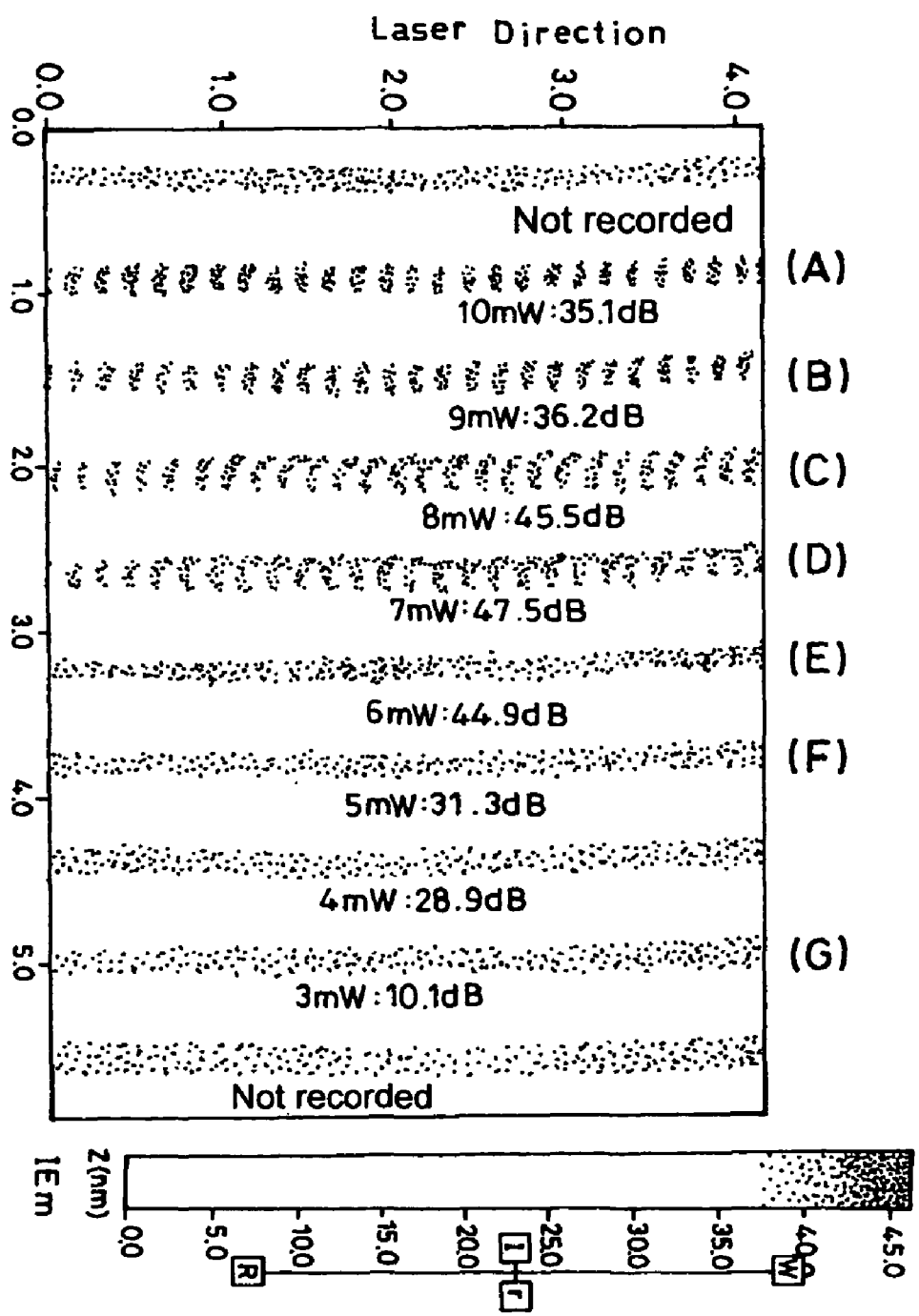
FIG. 6 is a graph showing an AFM image of the 2T mark train in a plan view which is recorded on the super-resolution optical recording medium with varying the recording power in stages.

FIGS. 6 ((A) to (G)) show the AFM images of the formed recording marks at the respective recording powers in plan view. The gradation in this AFM image indicates a concavo-convex profile. In other words, the dark colored sections are the convex sections, and the light colored sections are the concave sections. In this exemplary embodiment, the super-resolution optical recording medium is designed so that the convex sections correspond to the spaces with low reflectivity and the concave sections correspond to the recording marks with high reflectivity to form the recording marks.

In this concavo-convex profile, as shown in FIG. 5, the amount of deformation increases with an increase in the power from around a recording power of the recording laser beam of 6 mW.

As shown in FIG. 6, it is known that especially high CNRs (45 dB or more at 7 mW and 8 mW) are obtained when recording is carried out in such a manner that the center is formed into the concave section serving as the recording mark and sections before and after the center are formed into the convex sections serving as the spaces in the plan view.

When observing the AFM image of FIG. 6, it is clear that the recording laser moves from left to right in the drawing, in other words, the leading edge is on the left of the drawing and the trailing edge is on the right. This movement is enabled by adjusting the incident direction of the recording laser power, the rotational direction of the medium during recording, the fixed direction of the medium observed by the AFM, and the scan direction of the probe of the AFM.

Table 2 shows the difference $h_m$ in the height of the recording mark 26 (the convex section) with respect to the not-recorded section 29 in the recording layer 20, the ratio ($h_m$/ML) between the difference $h_m$ in the height of the recording mark 26 and the mark length ML, the recording laser power, and the value of CNR. It is apparent from table 2 that the CNR rapidly increases in the region where $h_m$/ML falls below $-0.01$.

TABLE 2

| ML = 75 nm | | | |
|---|---|---|---|
| h(nm) | CNR(dB) | Pw(mW) | $h_m$/ML |
| −10 | 35.1 | 10 | −0.13 |
| −10 | 36.2 | 9 | −0.13 |
| −9 | 45.5 | 8 | −0.12 |
| −9 | 47.5 | 7 | −0.11 |
| −2 | 44.9 | 6 | −0.02 |
| −1 | 35.2 | 5.5 | −0.01 |
| 0 | 31.3 | 5 | 0.00 |
| 0 | 28.9 | 4 | 0.00 |
| 0 | 10.1 | 3 | 0.00 |

Then, the mark length ML was changed. Tables 3 and 4 show the results measured using the same samples. MLs were set at 112.5 nm and 50 nm, respectively. Both of these mark lengths are in the size of super resolution in an optical system with a wavelength of 405 nm and an NA of 0.85.

TABLE 3

| ML = 112.5 nm | | | |
|---|---|---|---|
| h(nm) | CNR(dB) | Pw(mW) | $h_m$/ML |
| −26 | 34 | 10.0 | −0.23 |
| −23 | 43 | 9.0 | −0.21 |
| −19 | 43 | 7.0 | −0.17 |
| −10 | 45 | 6.5 | −0.09 |
| −6 | 47 | 6.0 | −0.05 |
| −3 | 38 | 5.5 | −0.03 |
| −1 | 35 | 5.0 | −0.01 |
| 0 | 18 | 4.5 | 0.00 |

TABLE 4

| ML = 50 nm | | | |
|---|---|---|---|
| h(nm) | CNR(dB) | Pw(mW) | $h_m$/ML |
| −8 | 36 | 9.0 | −0.16 |
| −8 | 40 | 8.0 | −0.16 |
| −7 | 42 | 7.0 | −0.14 |
| −3 | 37 | 6.0 | −0.07 |
| 0 | 26 | 5.0 | 0.00 |
| 0 | 0 | 4.5 | 0.00 |

It is apparent from tables 3 and 4 that in super resolution marks of different sizes, the CNR rapidly increases from the start of deformation as well. $h_m$/ML may be −0.01 (CNR≧35 dB) at the upper limit to the range of favorable deformation. $h_m$/ML may be −0.20 at the lower limit of favorable deformation. It is desirable that $h_m$/ML should not approach −0.20 or less as not only is the CNR reduced but the tracking servo also becomes extremely unstable.

For the optical recording medium, however, it is preferable that the longer the mark length is, the larger the signal amplitude becomes. The same holds true for the optical recording medium providing super resolution reproduction. Therefore, given these conditions, $h_m$ has to be smaller when the mark length is long rather than when the mark length is short.

Example 2

A super-resolution optical recording medium according to example 2 includes an Ag-alloy reflection film with a thickness of 40 nm, a first dielectric layer made of ZnS:SiO$_2$=85:15 with a thickness of 80 nm, a super resolution layer made of Sn$_{58}$Sb$_{42}$ with a thickness of 15 nm, a second dielectric layer made of ZnS:SiO$_2$=85:15 with a thickness of 45 nm, a recording layer made of PtOx with a thickness of 4 nm, a third dielectric layer made of ZnS:SiO$_2$=85:15 with a thickness of 45 nm, and a light transmission layer with a thickness of 0.1 mm, all of which are laminated in this order on a PC substrate. When recording marks with the size of the resolution limit or less and spaces with the size of the resolution limit or less were successively formed with varying recording power in stages as in the case of the aforementioned example 1, table 5 shows the results of observation as in the case of table 1.

TABLE 5

| ML = 75 nm | | | |
|---|---|---|---|
| h(nm) | CNR(dB) | Pw(mW) | $h_m$/ML |
| −15 | 35.6 | 10 | −0.20 |
| −14 | 36.7 | 9 | −0.18 |
| −15 | 38 | 8 | −0.20 |
| −12 | 40.1 | 7 | −0.16 |
| −10 | 43.4 | 6 | −0.13 |
| −3 | 40.5 | 5 | −0.04 |
| −2 | 35 | 4.5 | −0.02 |
| 0 | 24.1 | 4 | 0.00 |
| 0 | 0 | 3 | 0.00 |

It is apparent that the concavo-convex profile of the recording marks and the spaces when the CNR reaches a maximum during reproduction is the almost same as that of example 1. Deformation which brings about h minus is observed by the AFM at CNR>35 dB.

Example 3

Example 3 which uses a different optical system from example 1 will now be described. The optical system used in example 3 has a wavelength of 405 nm and an NA of 0.65.

A super-resolution optical recording medium includes a first dielectric layer made of $ZnS:SiO_2=85:15$ with a thickness of 90 nm, a recording layer made of PtOx with a thickness of 4 nm, a second dielectric layer made of $ZnS:SiO_2=85:15$ with a thickness of 40 nm, a super resolution layer made of $Sb_{75}Te_{25}$ with a thickness of 10 nm, a third dielectric layer made of $ZnS:SiO_2=85:15$ with a thickness of 80 nm, an Ag-alloy film with a thickness of 40 nm, and a resin protective layer with a thickness of 0.01 to 0.03 mm, all of which are laminated in this order on a polycarbonate substrate (serving as the light transmission layer).

Figure 7:
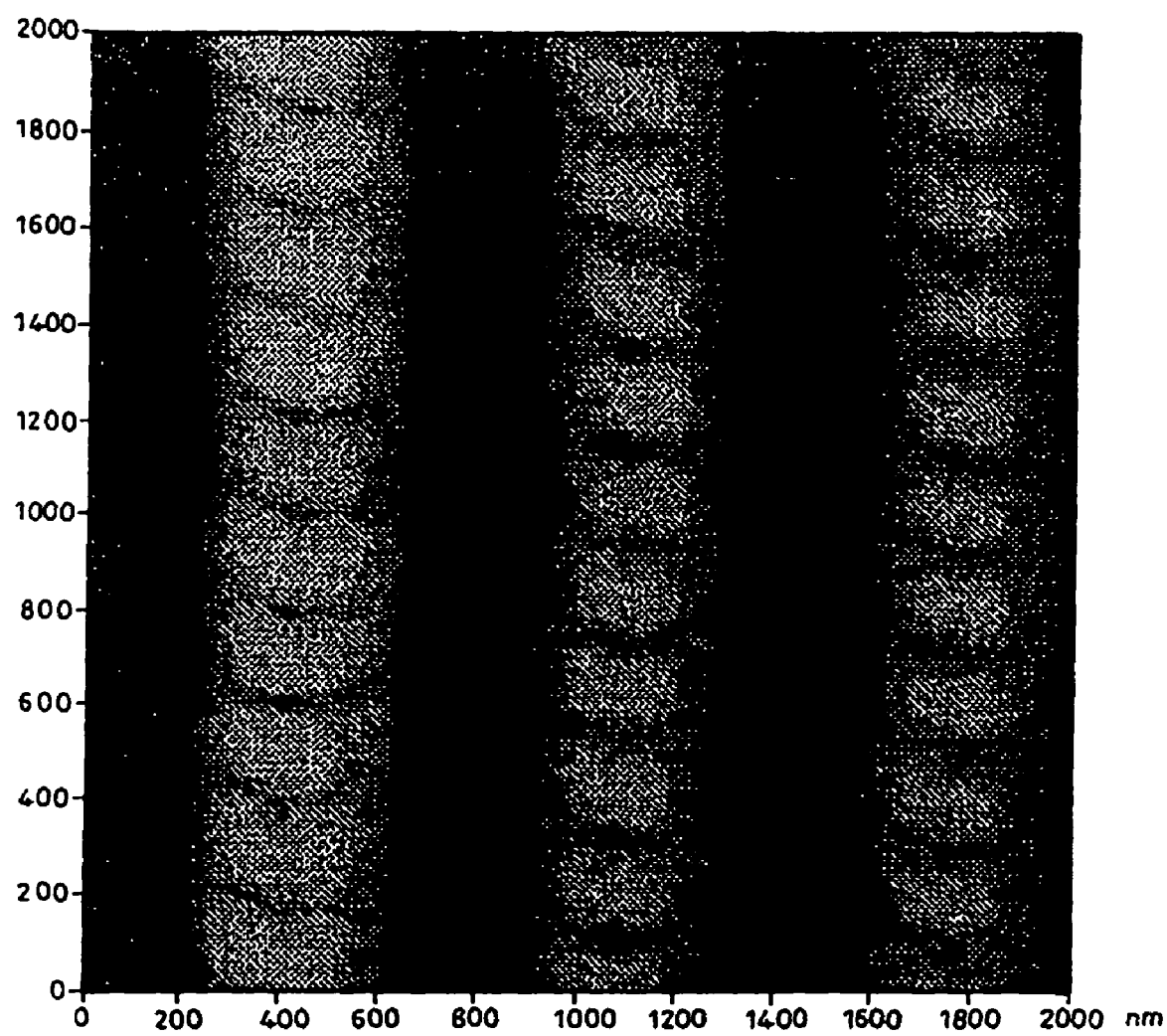
FIG. 7 is a graph showing an AFM image of recording mark and space trains in a plan view according to example 2 which are recorded by using an optical system different from that of the example 1.

After recording marks with a length of 98 nm, being the super resolution size and spaces with the same length were alternately recorded on this optical recording medium in succession, the CNR was measured on a recorded track. After measurement, only the polycarbonate substrate was dissolved and removed by chloroform to measure the surface shape by AFM. FIG. 7 shows the surface shape at a recording power of 12 mW (CNR 44 dB).

FIG. 7 shows three rows of tracks. In each track, concave sections (the bright sections) corresponding to the recording marks and convex sections (the dark sections) corresponding to the spaces are alternately observed. As with table 1, table 6 shows the relationship between the CNR and $h_m/ML$ based on observation results.

TABLE 6

| | ML = 98 nm | | |
|---|---|---|---|
| h(nm) | CNR(dB) | Pw(mW) | $h_m/ML$ |
| −16 | 44 | 12 | −0.16 |
| −10 | 43.6 | 10 | −0.10 |
| −1 | 41.7 | 8 | −0.01 |
| 0 | 28.5 | 6 | 0.00 |

It is apparent from table 6 that the CNR rapidly increases due to the occurrence of deformation. An upper limit for the present example may be −0.01. A lower limit could not be measured due to the upper limit of laser power being reached.

What is claimed is:

1. A super-resolution optical recording medium comprising a substrate and a recording layer formed on the substrate, wherein
   a recording mark, which has a size of a resolution limit or less of a reproduction optical system and can be reproduced by the reproduction optical system, is formed in the recording layer along a recording track, and at least the recording mark with the size of the resolution limit or less out of recording marks in a modulation code is a concave section with respect to a not-recorded section, and
   a ratio $h_m/ML$ between a height of the recording mark with respect to the not-recorded section in which a recording mark is not formed in the recording layer and a mark size ML is $-0.20 \, h_m/ML \leq -0.01$.

2. The super-resolution optical recording medium according to claim 1, wherein
   a height of the recording mark, with respect to the not-recorded section in which a recording mark is not formed in the recording layer, is higher than a height of another recording mark with respect to the not-recorded section, the another recording mark being longer than the recording mark.

3. An optical recording method for forming a recording mark and a space, which each have a size of a resolution limit or less of a reproduction optical system and can be reproduced by the reproduction optical system, in a recording layer of a super-resolution optical recording medium having a substrate and at least the recording layer, a super resolution layer, and a light transmission layer, all of which are formed on the substrate, the method comprising:
   forming the recording mark with the size of the resolution limit or less and the space with the size of the resolution limit or less by adjusting an intensity of a laser for recording or an emission pattern of the laser for recording such that at least the recording mark with the size of the resolution limit or less out of recording marks in a modulation code is formed into a concave section with respect to a not-recorded section, and
   a ratio $h_m/ML$ between a height of the recording mark with respect to the not-recorded section in which a recording mark is not formed in the recording layer and a mark size ML is $-0.20 \leq h_m/ML \leq -0.01$.

* * * * *